3,028,299
GERMICIDAL COMPOSITIONS AND METHODS FOR PREPARING THE SAME

Murray W. Winicov and William Schmidt, Flushing, N.Y., assignors to West Laboratories, Inc., Long Island City, N.Y., a corporation of New York
No Drawing. Filed Sept. 13, 1960, Ser. No. 55,732
22 Claims. (Cl. 167—17)

This invention relates to improvements in carrier iodine compositions and methods for preparing the same whereby it is possible to formulate carrier-iodine compositions having markedly enhanced stability. More particularly, the invention relates to the formulation of carrier-iodine compositions using as an iodine source a mixture of elemental iodine and a water soluble iodide with the iodine-iodide ratio adjusted to yield directly a carrier-iodine composition having an accurately predetermined amount of available iodine which remains essentially constant over extended periods of storage. Further, the invention relates to formulation procedures which are carried out without the need for heating either during or after formulation.

In the preparation of carrier-iodine compositions or complexes wherein iodine is solubilized and bound by a carrier which is a nonionic or cationic surface active agent or a mixture thereof, it has been customary to dissolve elemental iodine in the carrier or in a concentrated aqueous solution thereof with heating, and it is well recognized that in such process a portion of the iodine is lost, or becomes unavailable due to chemical reaction with the carrier. It is also well known that a carrier-iodine composition thus prepared undergoes change and further reduction in available iodine content for an extended period during storage. It has been proposed that this change of composition be accelerated by heating, beyond the extent of heating required in initial formulation, to deliberately consume a certain proportion of the iodine. While such a procedure is of some value in reducing subsequent change in available iodine content, the extended heating frequently effects a breakdown or chemical change in the carrier, modifying its surface active and/or detergent properties, as well as its iodine complexing capacity. Thus, while commercially useful carrier-iodine products are being prepared, it will be apparent that formulation procedures are complicated and product standardization presents a constant problem. Indeed, to be sure that a product will have the stated amount of available iodine after a normal period of storage, it is generally the practice to employ an abnormal excess of iodine, a practice which is undesirable for various reasons.

It has now been found, in accordance with the present invention, that carrier-iodine compositions can be prepared without any heating and in a manner to provide directly the amount of available iodine desired with assurance that such available iodine content will remain constant even after long periods of storage at room temperature, and at moderately elevated temperature, by employing as an iodine source for combining with the carrier, an aqueous solution of iodine and a water soluble iodide, preferably HI, or an alkali metal iodide, and adjusting the proportion of iodide to iodine for a particular aqueous carrier-iodine system, so as to provide a distribution coefficient in excess of about 150 and preferably in excess of 200, as determined by the equation:

$$D.C. = \frac{\text{mg. I in aqueous phase}}{\text{mg. I in heptane}} \times \frac{\text{ml. heptane}}{\text{ml. aqueous phase}}$$

It is necessary at this point to discuss distribution coefficient, and the manner of determining it, since this is a novel technique adapted by the present applicants, which for the first time provides a quick and accurate laboratory procedure for determining the extent of iodine complexation in carrier-iodine compositions.

Procedures heretofore available for determining the extent of complexing, or binding of elemental iodine in carrier-iodine compositions, have left much to be desired. Titration alone tells nothing of the extent of complexing. Titration, coupled with tests to determine iodine loss due to vapor pressure, provide meaningful information, but such tests are cumbersome and time-consuming, and are subject to variables which can give misleading results. At the same time, there is a very real need for knowing the extent of complexing in carrier-iodine products, since the presence of uncomplexed elemental iodine can produce an objectionable iodine odor, and permit escape of irritating iodine vapors from such products.

In meeting this need, a new technique has been developed for accurately determining extent of iodine complexing which employs a closed, equilibrium type system, and which depends on the equilibrium of iodine between an aqueous solution containing a complexing agent or carrier, and a non-miscible solvent, heptane. The initial amount of iodine in the aqueous solution is determined by ordinary thiosulfate titration. The final iodine concentration in the heptane is determined colorimetrically. The amount of iodine remaining in the aqueous phase is then found by difference.

The distribution of a common solute such as iodine between two mutually immiscible solvents (heptane and aqueous complexer in this case) is a reproducible characteristic for the solute and solvents involved at a specified temperature. For "ideal" solutions, and where the amount of solute used is small compared to its maximum solubility, the ratio of concentration of solute in the solvents is a constant, independent of the relative amounts of solvent or the amount of solute. Although the iodine solutions with which we are concerned do not properly fall into the "ideal" class, they are sufficiently close to this goal to give physical meaning to the distribution values obtained. Excellent reproducibility is possible, which makes the procedure a useful tool in evaluating even small differences between similar compositions.

The distribution coefficient (D.C.) as herein applied is determined by adding 1.00 ml. of standardized test solution containing between about 0.05 and 5.0% iodine to a 50 ml. graduated cylinder containing 25 mls. purified n-heptane. The temperature of the heptane is brought to $25 \pm 1°$ C. The cylinder is stoppered and shaken vigorously by hand for one minute during which time the aqueous solution suspends in the heptane as a uniform haze. The solution is then allowed to stand a minute or two, and the temperature adjustment and shaking are repeated. For best results the solution should settle for an hour, although only a minute or two are necessary if centrifuged.

The amount of iodine in the heptane layer can be determined colorimetrically at 520 m$\mu$ the absorption peak; the relationship between light absorption and iodine concentration in this solvent is linear throughout the range 1 to 25 mg. per 100 mls. The distribution coefficient is calculated by the following formula:

$$D.C. = \frac{\text{mg. I remaining in aq. phase}}{\text{mg. I in heptane}} \times \frac{\text{mls. heptane}}{\text{mls. aq. phase}}$$

Using the Beckman colorimeter with 1.00 cm. cells an absorption of 0.142 corresponded to 1.00 mg. iodine extracted by 25 mls. heptane. Values so obtained are readily reproducible to within 10%, and frequently to within 1%.

This method was adapted for the extensive study of differences in the complexing of iodine as a function of ratio of carrier to iodine and as a function of, or characteristic of different carriers. In the course of such studies, it was unexpectedly found that the amount of iodide in a carrier-iodine composition exerts a profound effect on the distribution coefficient, and that even a small amount of iodide can enhance the complexing with a resultant lowering of the vapor pressure of iodine in product type formulations. As illustrative of the type of data obtained by this method, a standard commercial carrier-iodine formulation was tested for titratable iodine and distribution coefficient, using samples which had been (a) Stored for 1 week.
(b) Stored for 10 weeks.
(c) Stored for 100 weeks, and
(d) Subjected to accelerated curing by heating, immediately after preparation, to 65° C. for 24 hours.

The data obtained is given in the following table:

TABLE I

| Approximate Age | Percent Tit. Iodine, w./v. | I⁻/I | D.C. |
| --- | --- | --- | --- |
| 1 Week | 2.25 | 0.21 | 36 |
| 10 Weeks | 2.10 | 0.32 | 104 |
| 100 Weeks | 2.00 | 0.42 | 255 |
| 24 hrs. heat cure | 2.10 | 0.31 | 104 |

The data in the foregoing table with respect to distribution coefficient provides a very accurate indication of the degree of iodine complexing, and conforms closely with practical experience which has demonstrated extent of complexing and freedom from iodine odor and irritating vapors to be a function of ageing or manner of ageing carrier iodine compositions. It has been determined through other tests that a distribution coefficient of about 150, and preferably in excess of about 200, is required to sufficiently complex the iodine and reduce the iodine vapor pressure to prevent objectionable iodine odor and irritating iodine vapors in carrier-iodine products.

In accordance with the present invention distinct advantages both from the standpoint of process simplification and product improvement can be realized by combining an iodine carrier directly with an aqueous iodine medium providing a source of iodide ($I^-$) in excess of about 0.25 parts per part of iodine. In this way a stable product can readily be obtained without heating or ageing, making possible what we refer to as a cold formulation process; and the presence of the iodide provides an enhancement in excess of about 50 in the distribution coefficient.

Special advantage is realized, however, when iodide is present in proportions greater than 0.25 part per part of iodine; and from a product standpoint, the invention in certain of its preferred aspects, resides in a germicidal composition consisting essentially of an aqueous solution of iodine and iodide complexed with an iodine carrier selected from the group consisting of nonionic and cationic synthetic surface active agents, said solution providing an amount of available iodine within the range of about 0.05 to 20%, and containing an amount of an iodide selected from the group consisting of HI and alkali metal iodides to provide an iodide to iodine ratio in excess of 0.4:1 and within the range of about 0.4:1 to about 5:1 sufficient to impart to said solution an enhancement in excess of about 50 and a value in excess of about 150 for distribution coefficient (D.C.) as determined by the equation:

$$D.C. = \frac{\text{mg. I in aqueous ph.}}{\text{mg. I in heptane}} \times \frac{\text{ml. heptane}}{\text{ml. aqueous ph.}}$$

The control of iodide concentration in the preparation of carrier-iodine formulations can be effected with equal ease using as a source of iodide either an alkali metal iodide or HI. The selection of a preferred iodide source will depend on the overall properties desired in a particular product, and for all products intended for environmental sanitation purposes, where relatively high acidity is desired, HI is employed as the iodide source since excessive concentrations of metal ions contribute to instability of such products. It is to be noted, however, whether using HI or alkali metal iodide, the solubilizing effect of the iodide on the iodine is sufficient to permit preparation of aqueous solutions having the desired iodide to iodine ratio suitable for room temperature mixing and complexing with the various iodine carriers or carrier mixtures.

If substantial amounts of aqueous HI-iodine solutions are to be used, a practical way has also been found for preparing such solution by reacting an aqueous slurry of solid iodine with a limited amount of hydrogen sulfide resulting in precipitation of sulfur (readily removed by filtration) and formation of HI in the solution. The particular proportion of HI to iodine in the product can be regulated by controlling the amount of hydrogen sulfide used in the reaction. Furthermore, since there is always an excess of iodine present, the hydrogen sulfide is completely reacted and the HI-iodine solution obtained after filtering off the precipitated sulfur, is essentially free from sulfide odor and suitable for use directly in the preparation of carrier-iodine compositions. Furthermore, in thus preparing HI-iodine solutions by direct reaction of iodine with $H_2S$ in an aqueous medium, the reaction can be controlled to produce mixtures of HI and iodine in widely varying proportions, including the range of proportions of iodide to iodine of 0.4:1 to 5:1 which were previously mentioned as preferred ratios in the preparation of carrier-iodine compositions. Thus, this method of preparing HI-iodine solutions constitutes a novel and commercially practical part of the present invention.

In preparing carrier-iodine compositions by the cold process which is made possible through the use of an iodine source which is a mixture of elemental iodine and HI, or an alkali metal iodide, the general procedure involves first preparing an aqueous solution of the iodine and iodide with these components in the relative proportions desired in the end product. The aqueous iodine-iodide solution can then be dissolved in the carrier by simple stirring together of the components at room temperature until solution is complete. In instances where carriers are themselves solid or semi-solid materials, it may be desirable to first dissolve the carrier in a minimum amount of water to provide a liquid carrier component for mixing with the aqueous iodine-iodide solution.

Another practical and novel way of providing the desired iodide-iodine proportions in aqueous carrier iodine systems is to introduce a reducing agent to an aqueous carrier-iodine system at room temperature, or slightly elevated temperature, and in an amount to react with a desired portion of the iodine to convert the same to iodide. For this in situ conversion of iodine to iodide, various reducing agents can be employed, but it is preferable to use sulfur dioxide or alkali metal sulfites such at $Na_2SO_3$. (In the presence of water $SO_2$, of course, forms $H_2SO_3$.) A typical reaction for this conversion can be represented by the equation:

$$H_2SO_3 + I_2 + H_2O \rightarrow 2HI + H_2SO_4$$

indicating that one equivalent of sulfuric acid or sulfate is formed for each two equivalents of iodide produced. It has been found that such sulfuric acid or sulfate, in the amounts thus introduced does not have the detrimental effect on the carrier-iodine compositions which might been expected in the light of the old art and the reversibility of the above equation. At the same time, the method provides great flexibility in the formulation of compositions having particular desired iodide-iodine ratios; and from the standpoint of cost in quantity production, the in situ reduction of iodine to iodide represents the preferred method of controlling the iodide-iodine ratio in accordance with the present invention.

In any of the formulation procedures above described, selection of the amount of water to include in the aqueous carrier-iodine composition will depend upon the type of product desired. It is possible with a limited amount of water to prepare carrier-iodine compositions which are in the nature of concentrates intended for further dilution with water to provide commercial products, or by using larger amounts of water in the initial preparation to directly obtain compositions which are ready for packaging and distribution as commercial products. Thus, for example, compositions containing from about 5% to about 20% iodine are in the nature of concentrates or intermediates for use in the formulation of varied iodine products, whereas compositions containing 0.1 to 2% iodine are adapted for direct use as commercial products for various types of germicidal application.

As for the carriers or carrier mixtures and the amounts thereof to be included in the new composition, it will be understood that the selection of type and amount of carrier will be based on known practices in the carrier-iodine art having in mind such variables as (a) characteristic iodine complexing capacity of the different carriers, (b) the extent to which surface active, detergent, or other properties of the carrier may be desired in a particular product. In other words, the present invention is not concerned with new carrier-iodine complexes per se, but rather with improvements that are made possible by the provision of excess or added iodide in compositions generally in which iodine is complexed with a nonionic or cationic iodine carrier. By way of illustration, however, it is pointed out that the principles of the present invention can be utilized to improve nonionic carrier-iodine preparations of the type disclosed in U.S. Patents No. 2,931,777 (Shelanski), No. 2,840,510 (Katz and Shelanski), No. 2,759,869 (Sutton and Reynolds), No. 2,710,277 (Shelanski and Winicov), and complexes of iodine with nonionic detergents of the type disclosed in U.S. Patent No. 2,504,064 (Bock and Rainey); as well as cationic carrier-iodine preparations of the type disclosed in U.S. Patent No. 2,679,533 (Darragh and House), U.S. Patent No. 2,860,084 (Jackson), and pending applications Serial No. 836,909, filed August 21, 1959, and Serial No. 12,700, filed March 4, 1960, assigned to applicants' assignee. With those carriers which are weaker iodine complexes, it is generally advisable to employ a higher iodide to iodine ratio than with carriers which are strong complexing agents. It is to be understood, however, that with all aqueous carrier-iodine systems wherein a surface active agent is employed, whether nonionic, cationic, or a mixture thereof, which is an effective iodine carrier, a marked improvement in iodine stability and complexing is achieved by including iodide in such systems in at least the minimum amounts in accordance with the present invention.

From the standpoint of cost, availability and general usefulness in various germicidal compositions, the following types of nonionic carriers are of particular interest:

(a) Nonionic carriers of the type disclosed in U.S. Patent No. 2,931,777 and generally embraced by the formula:

$$R(CH_2CH_2O)_xH$$

wherein R represents the residue of a water insoluble organic compound containing at least 6 carbon atoms and having an active hydrogen, and $x$ represents an integer within the range of 6 to about 100, and (b) Nonionic carriers of the type disclosed in U.S. Patent No. 2,759,869 and generally embraced by the formula:

$$HO(C_2H_4O)_x(C_3H_6O)_y(C_2H_4O)_{x'}-H$$

wherein $y$ equals at least 15 and $(C_2H_4O)_{x+x'}$ equals 20 to 90% of the total weight of said compound.

The following examples will provide a fuller understanding of the various adaptations and embodiments of the present invention, but it is to be understood that these examples are given by way of illustration and not of limitation.

In the examples the carriers identified by code or trade name have the following chemical compositions:

*Nonionics*

"Pluronic L62"=25 to 30 mols of polyoxypropylene condensed with 8.5 to 10.2 mols of ethylene oxide.
"Pluronic F68"=25 to 30 mols of polyoxypropylene condensed with 33 to 41 mols of ethylene oxide.
"Pluronic P85"=36 to 43 mols of polyoxypropylene condensed with 48 to 52 mols of ethylene oxide.
"Igepal CO-630"=nonyl phenol condensed with 9-10 mols of ethylene oxide.
"Igepal CO-710"=nonyl phenol condensed with 10-11 mols of ethylene oxide.
"Igepal CO-730"=nonyl phenol condensed with 15 mols of ethylene oxide.
"Surfonic TD-120"=tridecyl alcohol condensed with 12 mols of ethylene oxide.
"Myrj 53"=Stearic acid condensed with 50-60 mols of ethylene oxide.

*Cationics*

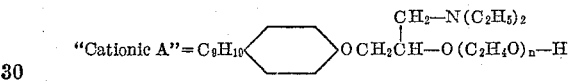

wherein "$n$"=22.
 "Cationic B"=formula of "cationic A"
where "$n$"=50.
 "Cationic C"=quaternary methiodide of "cationic B"

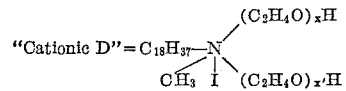

wherein $x+x'=50$.
 "Cationic E"=formula of "cationic D"
where $x+x'=15$.
 "Cationic F"=quaternary methiodide of "cationic A"

EXAMPLE I

A carrier-iodine concentrate was prepared by dissolving 46.6 gm. of elemental iodine in 250 gm. of detergent with stirring in a flask equipped with thermometer and heating mantle. The detergent was a mixture of 51% by weight of Pluronic L-62, 36.8% Igepal CO-730, and 12.2% Igepal CO-710. The stirred mixture was heated to about 65° C. until solution was complete, requiring about 1 hour. A 17.75 gm. sample of the resulting carrier-iodine concentrate was removed for product formulation, and heating of the remainder of the concentrate was continued for a total of 24 hours, with additional samples being removed for product formulation at intervals indicated in the following tabulation.

Product formulation was effected by dissolving the 17.75 gm. samples in an aqueous solution of 2.5 ml. isopropanol (95%) and 0.25 ml. concentrate HCl (36%) in sufficient water to give 100 ml. of final solution. Each composition therefore, contains 15% detergent and 2.75% total iodine on a wt./vol. basis.

1 ml. portion of each composition was tested for determination of distribution coefficient by mixing with 25 ml. of heptane and colorimetrically determining the iodine extracted by the heptane in accordance with the procedure herein described. The following tabulation gives the distribution coefficient results obtained with compositions prepared from samples having the different "cooking" times noted, together with data concerning percent titratable iodine, detergent/iodine ratio, absorbance at 520 mμ and corresponding milligrams of iodine extracted:

DISTRIBUTION COEFFICIENT AS A FUNCTION OF "COOKING" TIME

| Time | Percent Tit. Iodine | Det./I$_2$ | I$^-$/I$_2$ | Absorbance, 520 mμ | mg. I$_2$ extract. | D.C. |
|---|---|---|---|---|---|---|
| 1 hr | 2.75 | 5.9 | | 1.85 | 12.9 | 24 |
| 3 hr | 2.40 | 5.25 | 0.14 | 1.65 | 11.6 | 27 |
| 5 hr | 2.36 | 6.35 | 0.17 | 1.56 | 11.0 | 29 |
| 7 hr | 2.24 | 6.7 | 0.22 | 1.375 | 9.69 | 33 |
| 13 hr | 2.24 | 6.7 | 0.22 | 1.125 | 7.93 | 46 |
| 24 hr | 2.10 | 7.15 | 0.31 | 0.578 | 4.07 | 104 |

As a basis for reference, a sample of substantially identical product which had been stored and aged for 100 weeks (and which was originally prepared from a concentrate having only the ordinary amount of "cooking" required, i.e. about 5 hours) shows by titration an iodine content of 2.00% w./v. representing a detergent/iodine ratio of 7.5, and I$^-$/I$_2$ ratio of 0.42, and a distribution coefficient of 255. 25 ml. portions of the aged product and the products prepared from concentrates which had been "cooked" for 7, 13 and 24 hours respectively were placed in flat bottomed round dishes 3¾" in diameter suitably coded and six subjects evaluated the relative odor and irritating properties of the solutions. This evaluation established the aged product to be the least irritating (actually free of iodine odor and any irritating effect). The product prepared from the concentrate which had had 24 hr. "cooking" was next in order of performance, but showed noticeable iodine odor and some irritating properties. The products prepared from concentrates which had had 7 hr. or 13 hr. "cooking" were distinctly inferior with marked iodine odor and irritating properties.

The foregoing evaluation clearly demonstrates that there is a definite and useful relationship between distribution coefficient and the iodine odor and irritating properties of carrier-iodine compositions, and further that the distribution coefficient of 104 is insufficient to provide satisfactory products. Actually, it has been determined on the basis of numerous comparable tests, that a distribution coefficient of about 150 represents the point of transition above which products are superior from the standpoint of iodine odor and irritating effects.

EXAMPLE II

It is determined by analysis that the aged sample product and the product obtained from the 24 hr. "cooked" concentrate in Example I contain respectively about 1.0% and about 0.65% w./v. of iodide. An HI iodine concentrate solution was then prepared by combining 66 gm. of a 56% HI solution in water with 134 gm. of powdered U.S.P. iodine to give 200 gm. of solution containing 67% titratable iodine and 18.5% HI.

3.2 gm. of the above concentrate was added to 15 gm. of the detergent mixture as described in Example I. The resulting solution was dissolved in an aqueous isopropanol HCl solution as described in Example I to give 100 ml. solution having an iodide content of 0.6%. Another 3.2 gm. of the concentrate was dissolved in aqueous isopropanol HCl solution containing 0.72 gm. of 56% HI giving a solution having a total of 1% added iodide. The values for titratable iodine, detergent/iodine ratio, percent iodide, and distribution coefficient for these two products are tabulated below, product A corresponding substantially in iodide content with the aged product of Example I and product B corresponding substantially with the 24 hr. "cooked" product of Example I.

| Sample | Percent Tit. Iodine, w./v. | Det./I$_2$ | Percent Iodide | I$^-$/I$_2$ | D.C. |
|---|---|---|---|---|---|
| A | 2.23 | 6.7 | 1.0 (by add.) | 0.45 | 305 |
| B | 2.23 | 6.7 | 0.6 (by add.) | 0.27 | 105 |

The procedure described in this example, and the results obtained indicate that an addition of iodide at the time of formulation which can be accomplished in a cold process without heating or "cooking" of the carrier-iodine mixture, has essentially the same effect on distribution coefficient, hence on iodine odor and irritating effect, as the same amount of iodide developing in the product through objectionable "cooking" during formulation or inconveniently long periods of storage and ageing.

EXAMPLE III

A number of different nonionic and cationic detergent iodine carries were complexed with iodine in the presence of added iodide in proportions to provide aqueous products containing 10% detergent, 1% available iodine and varying amounts of HI or sodium iodide to provide from 0.4 to 2.0% I$^-$. All solutions were prepared by the cold process (without heating or cooking) by simply dissolving the aqueous iodine-iodide solution in the carrier and adjusting the water content of the final solution to provide the desired 10% detergent and 1% iodine concentration. The solutions, immediately after prepartion, were tested to determine distribution coefficient and the data thus obtained is presented in the following tabulation:

| Detergent | Distribution Coefficients (At Indicated Percent I$^-$) | | | | | |
|---|---|---|---|---|---|---|
| | 0.4 | 0.5 | 0.65 | 0.90 | 1.4 | 2.0 |
| Pluronic: | | | | | | |
| L62 | 121 | | 360 | 670 | 1,580 | |
| P65 | 110 | | 218 | 352 | 625 | |
| P85 | 126 | | 250 | 457 | 815 | |
| Igepal CO: | | | | | | |
| 630 | 97 | | 174 | 244 | 411 | |
| 710 | 100 | | 193 | 310 | 478 | |
| 730 | 114 | | 230 | 304 | 478 | |
| Surfonic TD120 | 112 | | 213 | 313 | 490 | |
| Myrj 53* | 82 | | 135 | 202 | 327 | |
| "Cationic A" | | 322 | | | | >5,000 |
| "Cationic B" | | 265 | | | | 800 |
| "Cationic C" | | 514 | | | | 1,000 |
| "Cationic D" | | 717 | | | | >3,000 |

*Detergent at 15% level; 10% solutions are cloudy.

The distribution coefficient values in the foregoing tabulation clearly demonstrate the profound effect of added iodide on the extent of iodine complexing effected with the various nonionic and cationic detergents tested. It is to be noted that the cationic carriers tested are inherently better complexers of iodine that the nonionics. In the case of the quaternary cationics C and D, the distribution coefficients are extremely high due in part to the iodide introduced in the quaternizing agent itself (methiodide).

EXAMPLE IV

The procedure of Example III is repeated using a single detergent, "Pluronic L-62" in differing amounts ranging from 5 to 50% and with 1% available iodine and from 0.4 to 1.4% I$^-$ supplied as HI. The distribution coefficients immediately after complexing without heating or "cooking" are as follows:

| Percent L62 | | Distribution Coefficients (At Indicated Percent I$^-$) | | | |
|---|---|---|---|---|---|
| | Percent I | 0.4 I$^-$ | 0.65 I$^-$ | 0.90 I$^-$ | 1.4 I$^-$ |
| 5 | 1.0 | 69 | 154 | 270 | split |
| 10 | 1.0 | 121 | 360 | 670 | 1,580 |
| 15 | 1.0 | 232 | 790 | 1,380 | 2,670 |
| 20 | 1.0 | 349 | 1,730 | 3,000 | 6,160 |
| 30 | 1.0 | 770 | 11,890 | | |
| 40 | 1.0 | 1,590 | 36,000 | | |

When these solutions are diluted with equal parts of water (cutting in half the concentration of detergent, iodine, and iodide), the distribution coefficients obtained are as follows:

| Percent L62 | Distribution Coefficients (At Indicated Percent I-) | | | | |
|---|---|---|---|---|---|
| | Percent I | 0.2 I- | 0.32 I- | 0.45 I- | 0.7 I- |
| 2.5 | 0.5 | 22 | 41 | 57 | 117 |
| 5* | 0.5 | 40 | 93 | 117 | 215 |
| 7.5 | 0.5 | 71 | 152 | 202 | 418 |
| 10 | 0.5 | 114 | 260 | 419 | 608 |
| 15 | 0.5 | 232 | 685 | | |
| 20 | 0.5 | 466 | 1,760 | | |

*At 2.0% I-; D.C.=461.

EXAMPLE V

The procedure as described in Example IV is repeated using a detergent, "Igepal CO-710." The distribution coefficients obtained at the 1% available iodine level are as follows:

| Percent CO-710 | Distribution Coefficients (At Indicated Percent I-) | | | | |
|---|---|---|---|---|---|
| | Percent I | 0.4 I- | 0.65 I- | 0.90 I- | 1.40 I- |
| 5 | 1.0 | 38 | 53 | 68 | Split |
| 10 | 1.0 | 100 | 193 | 310 | 478 |
| 15 | 1.0 | 190 | 526 | 1,250 | 2,162 |
| 20 | 1.0 | 204 | 1,210 | 4,350 | 6,300 |

When diluted to provide solutions having only 0.5% available iodine, the distribution coefficients are as follows:

| Percent CO-710 | Distribution Coefficients (At Indicated Percent I-) | | | | |
|---|---|---|---|---|---|
| | Percent I | 0.2 I- | 0.32 I- | 0.45 I- | 0.7 I- |
| 2.5 | 0.5 | 19 | 25 | 32 | 38 |
| 5.0 | 0.5 | 45 | 71 | 100 | 137 |
| 7.5 | 0.5 | 81 | 159 | 265 | 449 |
| 10 | 0.5 | 124 | 300 | 613 | 1,370 |
| 15 | 0.5 | 214 | 1,180 | 2,520 | 4,560 |
| 20 | 0.5 | 307 | 18,000 | | |

It will be evident from Examples IV and V, although iodine complexing can be increased both by increasing the amount of detergent or carrier and by increasing the amount of iodide, it requires only very small amounts of iodide to produce effects comparable to those produced by much larger amounts of detergent.

EXAMPLE VI

The procedures of Examples III to V are repeated using 5 different detergents in varying amounts with fixed amounts of iodine and iodide yielding the following distribution coefficients:

| Percent Detergent | Percent Iodine | Percent Iodide | Distribution Coefficients (with indicated detergents) | | | |
|---|---|---|---|---|---|---|
| | | | L62 | P65 | P85 | CO730 |
| 16.25 | 2.2 | 0.9 | 370 | 280 | 276 | 145 |
| 21.25 | 2.2 | 0.9 | 530 | 370 | 376 | 204 |
| 31.25 | 2.2 | 0.9 | 860 | 566 | too thick | 308 |

Dilutions of the foregoing solutions with equal parts of water give the following distribution coefficients:

| Percent Detergent | Percent Iodine | Percent Iodide | Distribution Coefficients (with indicated detergents) | | | |
|---|---|---|---|---|---|---|
| | | | L62 | P65 | P85 | CO730 |
| 8.1 | 1.1 | 0.45 | 119 | 90 | 90 | 68 |
| 10.6 | 1.1 | 0.45 | 166 | 117 | 123 | 103 |
| 15.6 | 1.1 | 0.45 | 265 | 182 | 205 | 162 |

The data in the foregoing tabulations is of special interest for comparative purposes, since the amount of iodide added is comparable to the amount of iodide formed (with attendant partial breakdown of the detergent) by the long ageing or "cooking" procedures previously necessary to obtain stable carrier-iodine preparations.

The middle item of the second tabulation above corresponds with a preferred type of commercial product containing about 1% available iodine and about 10% detergent. This solution is therefore compared with a solution containing a slight excess of iodide. The enhanced effect of such excess iodide on distribution coefficient is readily evident from the following tabulation:

| Percent Deterg. | Percent Iodine | Percent Iodide | Distribution Coefficients (with indicated detergents) | | | |
|---|---|---|---|---|---|---|
| | | | L62 | P65 | P85 | CO730 |
| 10.6 | 1.1 | 0.95 | 572 | 377 | 480 | 258 |
| 10.6 | 1.1 | 0.65 | 292 | 212 | 253 | 177 |
| 10.6 | 1.1 | 0.45 | 166 | 117 | 123 | 103 |

EXAMPLE VII

One hundred parts of a concentrated hydriodic acid solution containing 56% HI w./w. was placed in a glass lined vessel and two hundred and ten parts of commercial 99.5+% iodine was added with stirring. Stirring continued for two hours, during which time the solution cooled slightly. No heat was required. The finished iodine-HI concentrate titrated 67.5% available iodine; the hydriodic acid content was found to be 18% by titration with 1N sodium hydroxide to a pH5 endpoint.

To 85 parts by weight of Igepal CO-710 in a glass container equipped with a stirrer, 15 parts by weight of the above iodine-HI solution were added within about five minutes. The temperature rose about 10° C. over ambient. Analysis showed 10.0% available iodine w./w. (theory=10.1). This detergent-iodine concentrate is suitable for sale as an intermediate for the preparation of environmental sanitation products.

EXAMPLE VIII

The procedure of Example VII for preparing HI iodine solution was repeated using 200 parts of elemental iodine (instead of 210) and obtaining a solution containing 66.5% available iodine and 18.5% HI, both w./w.

To 700 grams Igepal CO-710 was added 300 grams of this iodine-HI solution with stirring. Temperature rose 25° C. over ambient. After five minutes of stirring, found 19.5% available iodine, which is almost exactly theory. This product is a suitable intermediate for preparing environmental sanitation products. Diluted to 1% iodine it has a pH of 2.4.

EXAMPLE IX

An iodine HI solution prepared by the procedure described in Example VII using 400 gm. of elemental iodine and 300 gm. of 56% hydriodic acid solution is found to contain 57.2% available iodine (equal to theory).

140 grams of this iodine solution is added with stirring to 260 grams of Pluronic 65 initially at room temperature. During 15 minutes of stirring, temperature reached a high of 65° C. Found 19.9% available iodine w./w. (theory=20.0). pH of a 1% solution was 2.4. Useful as a concentrate.

EXAMPLE X

Two hundred grams of Pluronic F-68, a wax-like solid melting at approximately 50° C., was heated to 60–65° C. with stirring in a glass vessel while 18 grams of the iodine solution of Ex. IX was added. Then while the mixture was still hot, 200 grams of water were added with stirring. Iodine found, 2.40% (theory 2.45%). This preparation is suitable for formulation in ointments or shampoos.

EXAMPLE XI 1000 grams U.S.P. sodium iodide was dissolved in 500 grams water which gave a slight heat of solution. To this solution, 1000 grams of elemental iodine was added with stirring, which caused the solution to cool. Available iodine found was 40.0% (=theory). The iodide content of this solution was 33.9%.

25 grams of this iodine-sodium iodide concentrate (in place of HI-iodine solution) were added to two hundred grams of molten Pluronic F-68, following the procedure as described in Example X. After addition of water as before the percent iodine w./w. found was 2.30% (theory 2.35%). This type preparation is valuable for applications where acid is not desired as in certain pharmaceutical type products.

EXAMPLE XII 540 grams of Pluronic P-85 was placed in a 600 ml. beaker equipped with a laboratory stirrer having a 2 inch stainless steel propeller. One hundred grams of the iodine-HI solution prepared as described in Example IX was added during about 60 seconds of stirring. The solution was allowed to stir an additional 10 minutes. Some heat was generated, raising the temperature about 20° C. Available iodine found, 10.3% w./w. (theory 10.35%).

Two hundred grams of this Pluronic P-85 iodine-HI concentrate was diluted to 1000 mls. by the rapid addition of warm (60° C.) distilled water with stirring. Available iodine found 1.96% w./v. (theory 2.06). After two weeks in a 125° F. oven, the available iodine was found to be 1.75% w./v. This is considered to have excellent stability.

EXAMPLE XIII

To 1000 grams of a 16% solution of Pluronic P-85 in water at room temperature, 33.3 grams of the iodine-HI composition of Ex. IX was added with stirring. Complete solution was effected within 5 minutes. Available iodine found, 1.90% (= theory). This preparation was almost identical with that of Ex. XII in physical and chemical properties, and was suitable for direct use as a germicidal product.

The type direct formulation of dilute (1 to 2%) iodine solutions as described in Example XIII is one of the most important aspects of the invention. It was to have been anticipated that adding a solution of iodine in an iodide that was too low in iodide to support "infinite" dilution in water, would result in immediate precipitation upon hitting a predominantly aqueous medium. It is also possible to prepare products from aqueous solutions of detergents and the iodine-iodide solutions by direct metering and mixing in pipeline transit. The potential economies in handling are substantial for large scale production.

EXAMPLE XIV 1000 grams of powdered iodine were slurried in 1000 grams of water and stirred with a heavy duty low speed motor. Hydrogen sulfide gas was introduced below the liquid surface from a weighed cylinder at a rate equal to its uptake by the solution. The temperature increased slightly during the reaction. When 68 grams of hydrogen sulfide had been added, the reaction was stopped. Available iodine found was 33% w./w.; hydriodic acid content was 17%. The product was decanted from the precipitated sulfur, which coalesced into a ball. The insulating HI-iodine solution is suitable for use in the preparation of iodine formulations as described in the foregoing examples. The addition of $H_2S$ can be continued for an appropriate time to provide directly the iodine-iodide ratio desired.

EXAMPLE XV

Pluronic P-65 (paste), 418.5 grams, was warmed to 40° and poured into a one-liter 3-necked flask fitted with paddle stirrer, thermometer and stopper. With stirring, 71.5 grams of powdered iodine was added, and the stirring continued. The small heat of solution was sufficient to maintain the temperature at 35–40° C., which was about 10° over room temperature. At the end of 2 hours, titration showed 12.4% available iodine (14.3% theory). Approximately 87% of the iodine was in the available form.

In order to prepare a series of detergent-iodine compositions containing 15% detergent and 2.5% total iodine, 17.5 grams of the above concentrate was diluted with about 50 mls. of water, and a solution containing an appropriate amount of reducing agent was added. The solution was then diluted to 100 mls. and titrated; the pH was recorded and a sample placed in the 125° F. oven. The results are presented below in tabular form:

| Compn. | Reducing Agent Added | Percent Av. Iod. | pH | Dist. Coeff. | 2 Weeks Oven, Percent Av. Iodine |
|---|---|---|---|---|---|
| 1 | None | 2.13 | 1.9 | 26 | 1.70 |
| 2 | $SO_2$; 0.15 g. in 15 ml. $H_2O$ | 1.60 | 1.2 | 490 | 1.60 |
| 3 | $NaHSO_3$; 0.20 g, in 3 ml. $H_2O$. | 1.65 | 1.35 | 466 | 1.63 |
| 4 | $Na_2SO_3$; 0.25 g, in 3 ml. $H_2O$ | 1.65 | 1.85 | 472 | 1.64 |
| 5 | sim. to 4, except 0.24 gm. NaOH added. | 1.35 | 7.0 | 1,080 | 1.31 |

The ease of reduction of iodine by sulfur dioxide and sulfites indicates that these can be used in certain product formulations to obtain the desired iodide to iodine ratio. One way of accomplishing this is to add the required amount of sulfite in the form of an aqueous solution to the "product" with stirring; preferably introducing the solution below the liquid level. If greater acidity is desired, gaseous $SO_2$ from a cylinder containing this gas should be introduced through a suitable connection at the bottom of the tank. Stoichiometrically, one pound of iodine can be converted to one pound of iodide with 0.25 lb. $SO_2$, 0.41 lb. $NaHSO_3$; or 0.47 lb. $Na_2SO_3$. The extra "reagent" cost for this "in situ" iodide production is insignificant as compared to the difference in price between iodine and iodide.

The cationic carriers, and particularly quaternary methiodides of the type herein described provide a special advantage when it is desired to prepare germicidal solutions of relatively high dilution which exhibit a distribution coefficient in excess of 150. This appears to be due to a high potentiating effect of iodide, and with appropriate amounts of iodide (i.e. the total provided by the methiodide moiety plus added iodide), it is possible to prepare satisfactory diluted products containing as little as 0.05% iodine in the presence of 0.5% cationic carrier. The following example is illustrative.

EXAMPLE XVI

The procedure as described in Example III was repeated with a number of cationic (quaternary methiodide) carriers to form complexes with iodine in proportions to provide aqueous solutions containing 1% carrier and 0.1% available iodine (or in certain instances 0.5% carrier and 0.05% available iodine) and amounts of added iodide (NaI) to give a total $I^-$ concentration (from methiodide and from NaI) as indicated in the following tabulations. The distribution coefficients as shown were obtained immediately after preparation of these solutions.

| Carrier | | Available $I_2$, percent | $I^-$ (total), percent | D.C. |
|---|---|---|---|---|
| Ident. | Conc., percent | | | |
| "Cationic C" | 1 | 0.1 | 0.14 | 249 |
| "Cationic E" | 1 | 0.1 | 0.16 | 1,200 |
| "Cationic D" | 1 | 0.1 | 0.22 | 183 |
| "Cationic D" | 1 | 0.1 | 0.39 | 237 |
| "Cationic E" | 0.5 | 0.05 | 0.15 | 236 |
| "Cationic E" | 0.5 | 0.05 | 0.23 | 594 |

EXAMPLE XVII

The procedure as described in Example III was repeated with a mixture of nonionic and cationic carriers to form complexes with iodine and iodide in proportions to provide an aqueous solution containing 5% nonionic carrier (Igepal CO-710), 5% cationic (cationic D), 1% iodine, and 0.9% iodide ($I^-$) as supplied by both the cationic carrier and NaI. For comparison purposes similar solutions were prepared containing 5% of the nonionic carrier only, and 5% of the cationic carrier only, with 1% iodine and 0.9% $I^-$. The distribution coefficients for these solutions are as follows:

| Carrier | D.C. |
|---|---|
| 5% nonionic plus 5% cationic | 225 |
| 5% nonionic | 68 |
| 5% cationic | 128 |

It will be evident that the distribution coefficient when using the mixed carrier is not only much higher than when using either carrier alone, but is also substantially higher than the total of the distribution coefficients with the individual carriers.

Various changes and modifications in the procedures and compositions herein described will occur to those skilled in the art, and to the extent that such changes and modifications are embraced by the appended claims, it is to be understood that they constitute part of the present invention.

We claim:
1. The method for directly preparing a stable germicidal carrier-iodine composition wherein iodine is associated with an iodine carrier selected from the group consisting of nonionic and cationic synthetic surface active agents and mixtures thereof, that comprises combining the carrier and iodine in an aqueous medium under conditions to provide in said medium a source of iodide ($I^-$) in excess of about 0.25 parts per part of iodine, the presence of said iodide imparting to said composition an enhancement in excess of about 50 in distribution coefficient (D.C.) as determined by the equation:

$$D.C. = \frac{mg. \text{ I in aqueous ph.}}{mg. \text{ I in heptane}} \times \frac{ml. \text{ heptane}}{ml. \text{ aqueous ph.}}$$

2. The method as defined in claim 1 wherein the iodide ($I^-$) is present in an amount in excess of about 0.4 parts per part of iodine and sufficient to provide a distribution coefficient (D.C.) value in excess of about 150.

3. The method as defined in claim 1 wherein the source of iodide is a substance selected from the group consisting of HI and alkali metal iodides.

4. The method as defined in claim 1 wherein the iodine and iodide are supplied in the form of a concentrated aqueous solution of iodine and a substance selected from the group consisting of HI and alkali metal iodides.

5. The method as defined in claim 4 wherein said concentrated aqueous solution is dissolved in said carrier, and the solution obtained is a germicidal concentrate adapted for further dilution in preparing consumer products.

6. The method as defined in claim 4 wherein the carrier in aqueous solution is mixed with said concentrated aqueous solution to form directly a germicidal solution adapted for use as a consumer product.

7. The method as defined in claim 1 wherein the iodine and iodide are supplied in the form of a concentrated aqueous solution of iodine and HI.

8. The method as defined in claim 7 wherein the HI-iodine solution is prepared by passing $H_2S$ through an aqueous slurry of elemental iodine until the desired iodide-iodine ratio is obtained and iodine is completely in solution, and filtering off the precipitated sulfur.

9. The method as defined in claim 1 wherein the source of iodide is an excess of elemental iodine in combination with a reducing agent selected from the group consisting of sulfur dioxide and alkali metal sulfides whereby iodide is formed in situ.

10. A germicidal complex of an iodine carrier selected from the group consisting of nonionic and cationic synthetic surface active agents with iodine and iodide prepared in accordance with the method as defined in claim 1.

11. A germicidal composition consisting essentially of an aqueous solution of iodine and iodide complexed with an iodine carrier selected from the group consisting of nonionic and cationic synthetic surface active agents and mixtures thereof, said solution providing an amount of available iodine within the range of about 0.05 to 20% and containing an amount of iodide selected from the group consisting of HI and alkali metal iodides to provide an iodide to iodine ratio in excess of 0.4:1 and within the range of about 0.4:1 to about 5:1, the presence of said iodide imparting to said solution an enhancement in excess of about 50, and a value in excess of about 150, for distribution coefficient (D.C.) as determined by the equation:

$$D.C. = \frac{mg. \text{ I in aqueous ph.}}{mg. \text{ I in heptane}} \times \frac{ml. \text{ heptane}}{ml. \text{ aqueous ph.}}$$

12. A germicidal composition as defined in claim 11 wherein said iodine carrier is a nonionic synthetic surface active agent and is present in the amount of about 5 to 20% with the iodine content ranging from 0.5 to 2%.

13. A germicidal composition as defined in claim 11 wherein said iodine carrier is a cationic synthetic surface active agent and is present in an amount in excess of about 0.5% with the iodine content being at least 0.05%.

14. A germicidal composition as defined in claim 11 wherein the available iodine content is within the range of about 5 to 20% and said composition is particularly suited for use as a concentrate for preparing commercial germicidal products.

15. A germicidal composition as defined in claim 11 wherein the available iodine content is within the range of about 0.05 to 2.0% and said composition is suited for use as a commercial germicidal product.

16. A germicidal composition consisting essentially of an aqueous solution of iodine and iodide with an iodine carrier of the formula:

$$R(CH_2CH_2O)_x \cdot H$$

wherein R represents the residue of a water-insoluble organic compound containing at least 6 carbon atoms and having an active hydrogen, and $x$ represents an integer within the range of 6 to about 100, said solution providing an amount of available iodine within the range of about 0.05 to 20% and containing an amount of iodide selected from the group consisting of HI and alkali metal iodides to provide an iodide to iodine ratio in excess of 0.4:1 and within the range of about 0.4:1 to about 5:1, the presence of said iodide imparting to said solution an enhancement in excess of about 50, and a value in excess of about 150, for distribution coefficient (D.C.) as determined by the formula:

$$D.C. = \frac{\text{mg. I in aqueous phase}}{\text{mg. I in heptane}} \times \frac{\text{ml. heptane}}{\text{ml. aqueous ph.}}$$

17. A germicidal composition consisting essentially of an aqueous solution of iodine and HI with an iodine carrier which is nonyl phenol condensed with 10–11 mols of ethylene oxide, said solution containing approximately 10% of said carrier, 1% iodine and 0.9% iodide (I⁻).

18. A germicidal composition consisting essentially of an aqueous solution of iodine and iodide with an iodine carrer of the formula:

$$HO(C_2H_4O)_x(C_3H_6O)_y(C_2H_4O)_{x'}\text{---}H$$

wherein $y$ equals at least 15 and $(C_2H_4O)_{x+x'}$ equals 20 to 90% of the total weight of said compound, said solution providing an amount of available iodine within the range of about 0.5 to 20% and containing an amount of iodide selected from the group consisting of HI and alkali metal iodides to provide an iodide to iodine ratio in excess of 0.4:1 and within the range of about 0.4:1 to about 5:1, the presence of said iodide imparting to said solution an enhancement in excess of about 50, and a value in excess of about 150, for distribution coefficient (D.C.) as determined by the formula:

$$D.C. = \frac{\text{mg. I in aqueous phase}}{\text{mg. I in heptane}} \times \frac{\text{ml. heptane}}{\text{ml. aqueous ph.}}$$

19. A germicidal composition consisting essentially of an aqueous solution of iodine and HI with an iodine carrier which is 25 to 30 mols of polyoxypropylene condensed with 8.5 to 10.2 mols of ethylene oxide, said solution containing approximately 10% of said carrier, 1% iodine and 0.65% iodide (I⁻).

20. A germicidal composition consisting essentially of an aqueous solution of iodine and HI with an iodine carrier which is 36 to 43 mols of polyoxypropylene condensed with 48 to 52 mols of ethylene oxide, said solution containing approximately 10% of said carrier, 1% iodine, and 0.65% iodide (I⁻).

21. A germicidal composition consisting essentially of an aqueous solution of iodine, alkali metal iodide, and an iodine carrier of the formula:

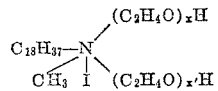

wherein $x+x'$ equals approximately 50, said solution containing approximately 1% of said carrier, 0.1% iodine and 0.39% iodide (I⁻).

22. A germicidal composition consisting essentially of an aqueous solution of iodine, alkali metal iodide, and an iodine carrier of the formula:

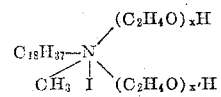

wherein $x+x'$ equals approximately 15, said solution containing approximately 0.5% of said carrier, 0.05% iodine and 0.15% iodide (I⁻).

References Cited in the file of this patent
UNITED STATES PATENTS

| | | |
|---|---|---|
| 2,679,533 | Darragh | May 25, 1954 |
| 2,759,975 | Chiddix | Aug. 21, 1956 |
| 2,775,604 | Zech | Dec. 25, 1956 |
| 2,840,510 | Katz | June 24, 1958 |
| 2,860,884 | Jackson | Nov. 11, 1958 |
| 2,863,798 | Shelanski | Dec. 9, 1958 |
| 2,868,686 | Shelanski | Jan. 13, 1959 |
| 2,876,263 | Mark | Mar. 3, 1959 |
| 2,931,777 | Shelanski | Apr. 5, 1960 |